United States Patent
Todaka

(10) Patent No.: US 6,785,022 B1
(45) Date of Patent: Aug. 31, 2004

(54) DATA COMMUNICATION METHOD OF APPARATUS CONNECTED TO LAN

(75) Inventor: Shinji Todaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/283,209

(22) Filed: Apr. 1, 1999

(30) Foreign Application Priority Data

Apr. 7, 1998 (JP) .......................................... 10-110074
Apr. 13, 1998 (JP) .......................................... 10-115880

(51) Int. Cl.[7] ................................................ H04N 1/32
(52) U.S. Cl. ....................... 358/442; 358/1.15; 358/434
(58) Field of Search ............................. 358/442, 435, 358/1.9, 1.15, 434, 400, 460

(56) References Cited

U.S. PATENT DOCUMENTS

| | | | |
|---|---|---|---|
| 4,556,959 A | * 12/1985 | Allen et al. | ................... 400/70 |
| 4,754,428 A | * 6/1988 | Schultz et al. | |
| 5,220,674 A | * 6/1993 | Morgan et al. | |
| 5,323,393 A | * 6/1994 | Barrett et al. | |
| 5,377,017 A | * 12/1994 | Lam | ........................... 358/405 |
| 5,467,434 A | * 11/1995 | Hower, Jr. et al. | |
| 5,517,324 A | * 5/1996 | Fite et al. | .................... 358/434 |
| 5,608,786 A | * 3/1997 | Gordon | ....................... 370/352 |
| 5,625,757 A | * 4/1997 | Kageyama et al. | |
| 5,696,894 A | * 12/1997 | Ono | |
| 5,768,516 A | * 6/1998 | Sugishima | |
| 5,798,845 A | * 8/1998 | Baek et al. | ................. 358/434 |
| 5,802,260 A | * 9/1998 | Shimakawa et al. | ........ 358/1.15 |
| 5,838,926 A | * 11/1998 | Yamagishi | ................... 709/249 |
| 5,845,076 A | * 12/1998 | Arakawa | |
| 5,864,673 A | * 1/1999 | Ohto et al. | .................. 709/219 |
| 5,936,743 A | * 8/1999 | Satoh | ......................... 358/434 |
| 5,996,029 A | * 11/1999 | Sugiyama et al. | |
| 6,005,677 A | * 12/1999 | Suzuki | ........................ 358/442 |
| 6,020,981 A | * 2/2000 | Ogiyama | .................... 358/434 |
| 6,072,862 A | * 6/2000 | Srinivasan | ............ 379/100.08 |
| 6,081,347 A | * 6/2000 | Yasuda | ........................ 358/400 |
| 6,094,276 A | * 7/2000 | Yamaguchi et al. | |
| 6,157,465 A | * 12/2000 | Suda et al. | ................. 358/407 |
| 6,384,927 B1 | * 5/2002 | Mori | ......................... 358/1.15 |

* cited by examiner

Primary Examiner—Bhavesh M. Mehta
Assistant Examiner—Aaron Carter
(74) Attorney, Agent, or Firm—Fitzpatrick, Cella, Harper & Scinto

(57) ABSTRACT

A data processing apparatus includes a connection unit for connecting a plurality of terminals, a storage unit for storing respective processing abilities of the plurality of terminals, a reception unit for receiving data via a line, a converting unit for converting the data received by the reception unit in accordance with the processing abilities stored in the storage unit, and a transfer unit for transferring the data converted by the converting unit to one of the plurality of terminals via the connection unit. A method of controlling a data processing apparatus capable of connecting a plurality of terminals, includes the steps of storing respective processing abilities of the plurality of terminals, receiving data via a line, converting the received data in accordance with the stored processing abilities, and transferring the converted data to one of the plurality of terminals.

4 Claims, 7 Drawing Sheets

FIG. 3

| PRINTER NUMBER | NETWORK ADDRESS | PRINTER ABILITY |
|---|---|---|
| 0 | 000.000.000.000 | 400, 200/A4, LTR/MH, MR/1 |
| 1 | 172.220.033.022 | 600, 400, 200/A4, A3, LTR, LGL/LIPS/1 |
| 2 | 172.220.033.023 | 400, 200/A4, A3/LIPS, JPEG/256 |

FIG. 4

| USER'S NAME | PASSWORD | CALLER ID | PRINTER NUMBER |
|---|---|---|---|
| AKAI | ****** | 324435544 | 1 |
| KUBOTA | ****** | 232423323 | 2 |
| SASAKI | ****** | 423252554 | 1, 2 |
| ⋮ | ⋮ | ⋮ | ⋮ |

DATA COMMUNICATION METHOD OF APPARATUS CONNECTED TO LAN

BACKGROUND OF THE INVENTION

1. Field of the Invention

The present invention relates to a data communication apparatus connected to a LAN capable of connecting a plurality of terminals, and to a control method for such a data communication apparatus.

2. Related Background Art

With recent wide use of networks in offices, OA apparatuses such as printers and facsimile apparatuses are connected to a network such as a local area network (LAN).

Under such office environments, a LAN facsimile system is configured by connecting to a LAN a plurality of facsimiles capable of transmitting/receiving fax data and printing out data, a plurality of clients such as computers using such facsimiles, and a plurality of printers shared in LAN.

In this LAN facsimile system, a client can send a transmission command including a transmission image via LAN to a facsimile apparatus, and in response to the transmission command, the facsimile apparatus can send the transmission image to a destination partner via a telephone line. After the image is transmitted, a transmission result report is printed out on the facsimile apparatus.

After an image is received at the facsimile via the telephone line, a reception result report is printed out at the facsimile.

If an image received at a facsimile apparatus is to be printed out at another terminal of LAN, this output terminal is required to have an output format same as that of the facsimile.

When a received image is to be printed out at an output terminal corresponding to a transmission side or corresponding to an output terminal designated by the transmission side, making the best use of the abilities or performances of the output terminal is not possible in some cases.

SUMMARY OF THE INVENTION

It is an object of the present invention to provide a data communication apparatus and method capable of solving the above problems.

It is another object of the present invention to provide a data communication apparatus and method capable of printing out a transmission result report at a desired terminal on LAN when data is transmitted upon an instruction from another terminal on LAN.

It is another object of the present invention to provide a data communication apparatus and method capable of printing out a reception result report at a desired terminal on LAN when data is received.

It is another object of the present invention to provide a data communication apparatus and method capable of readily printing out received data at a desired terminal on LAN.

The above and other objects of the invention will become more apparent from the following detailed description of embodiments when read in conjunction with the accompanying drawings.

BRIEF DESCRIPTION OF THE DRAWINGS

FIG. 3 is a diagram showing an example of the format of a printer information table.

FIG. 4 is a diagram showing an example of the format of a user information table.

DETAILED DESCRIPTION OF THE PREFERRED EMBODIMENTS

First Embodiment

Figure 1:
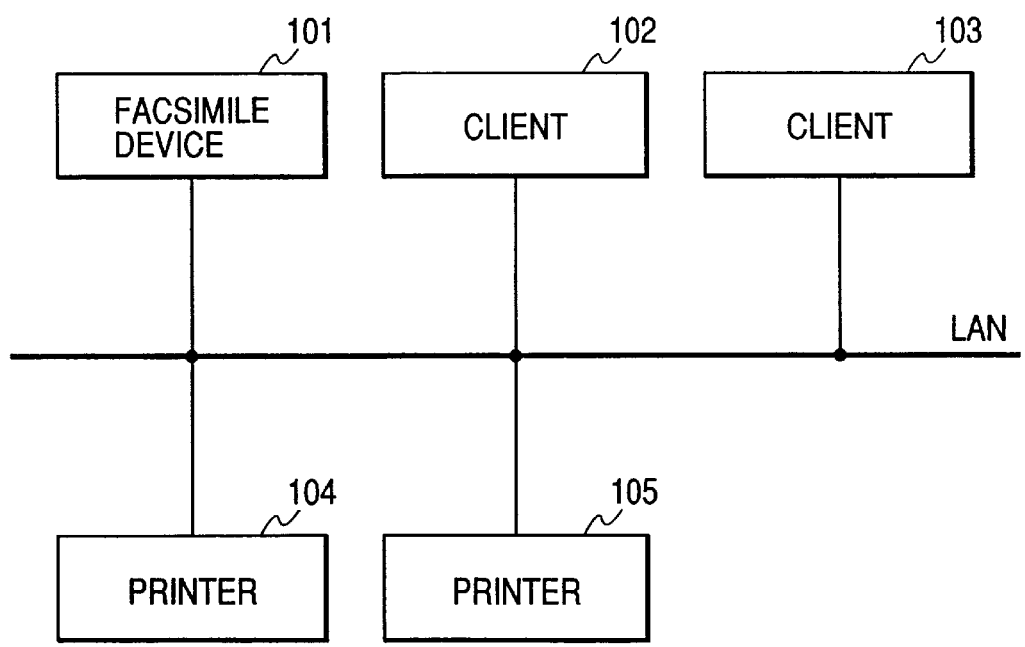
FIG. 1 is a block diagram showing the outline structure of a LAN facsimile system according to a first embodiment of the invention.

FIG. 1 is a block diagram showing the outline structure of a LAN facsimile system according to the first embodiment of the invention.

This LAN facsimile system is configured by connecting to a LAN a facsimile 101 capable of transmitting/receiving fax data and printing out data, clients (personal computers) 102 and 103 using the facsimile 101, and printers 104 and 105 shared in LAN.

For example, the printer 104 can print out an image at a resolution higher than that of an image which the facsimile apparatus 101 can output, and the printer 105 is a color printer capable of printing out a color image. Users of the LAN facsimile system configured as above are managed by the facsimile apparatus 101.

Figure 2:
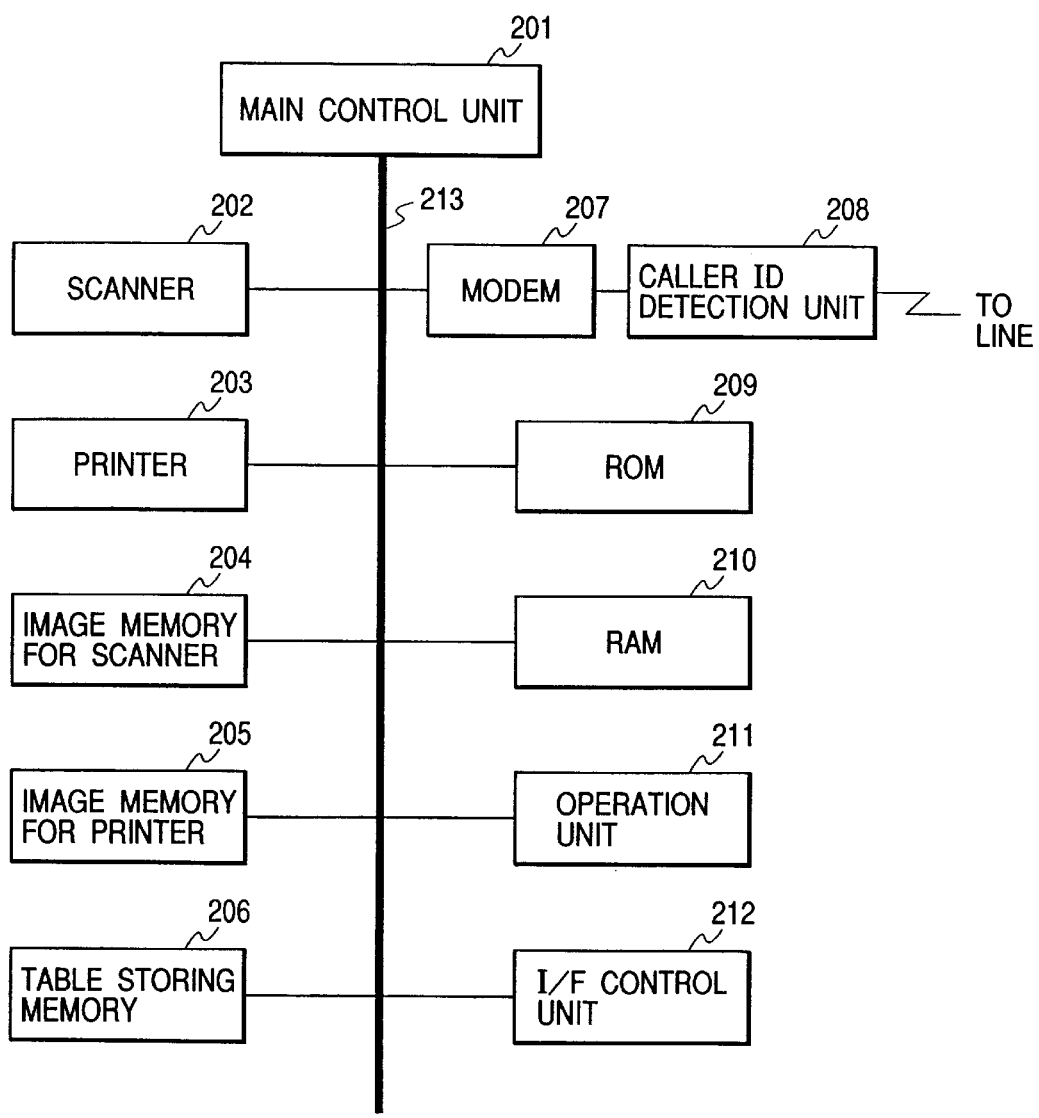
FIG. 2 is a diagram showing an example of the structure of a facsimile apparatus 101 of the first embodiment shown in FIG. 1.

FIG. 2 shows an example of the structure of the facsimile apparatus of the first embodiment.

In FIG. 2, reference numeral 201 represents a main control unit constituted of a CPU (central processing unit) and controlling the entirety of the facsimile apparatus. The main control unit 201 is connected via a bus 213 with: a scanner 202 for reading an image of an original and outputting image data of the original image; a printer 203 for printing out a visual image corresponding to input image data; an image memory 204 for storing image data obtained by the scanner 202; an image memory 205 for storing image data to be output from the printer 203; and a memory 206 for storing information such as abilities of each printer on LAN and user information of the LAN facsimile system.

Although a page memory is used as the image memories 204 and 205 in this embodiment, a line memory may be used. The image memory 204 stores not only the image data obtained by the scanner 202 but also image data sent from the clients 102 and 103. The details of information stored in the memory 206 will be described later.

The main control unit 201 is also connected via the bus 213 with: a modem 207 to be connected a line; a Caller ID detection unit 208 for detecting a Caller ID; a ROM 209 for storing programs which control the facsimile apparatus; a RAM 210 to be used as a working area; an operation unit 211 to be used for the display of data and the like and for the registration operation regarding the LAN facsimile system; and an I/F control unit 212 for controlling LAN connection.

FIG. 3 is a diagram showing an example of the format of a printer information table to be stored in the memory 206.

This table can store data entered through the operation by the operation unit 211 or through the operations by the clients 102 and 103. This table stores the abilities of each printer on LAN (information representing the function of each printer), in correspondence with a network address. The network address is a specific identifier given for each printer, and notifies the facsimile apparatus 101, clients and the like of the location of the printer on LAN.

The abilities of each printer stored in correspondence with the network address are written by ASCII codes, and include a resolution, a usable paper size, a compatible image format, and the usable number of colors. If the network address is already registered, these abilities may be acquired directly from the printer and stored in the table, by using the network address. The memory 206 also stores therein a conversion table for converting image data of various formats into image data of a specific format in accordance with the abilities of each printer.

FIG. 4 shows an example of the format of a user information table to be stored in the memory 206.

Similar to the printer information table, the user information table can store data entered through the operation by the operation unit 211 or through the operations by the clients 102 and 103. The user information includes a user name, a password, a Caller ID, and a printer number, which are assumed to be written by ASCII codes.

The user name and password are used when the user logs in the LAN facsimile system. It is necessary that each user name is unique. A Caller ID is a telephone number of a transmission side which is sent from an exchange to a reception side at timings between call signals, prior to line connection on the side of the reception apparatus.

The printer number is used for indicating a correspondence between a user and a printer. The printer number corresponds to the sequential number of each user stored in the printer user information table. In this embodiment, the printer number "0" corresponds to the printer 203 of the facsimile apparatus 101 itself. It is not necessary that each user fixedly uses a particular printer, but each user can use a plurality of printers. If a plurality of printers are to be registered, they are registered with priority orders.

Figure 5:
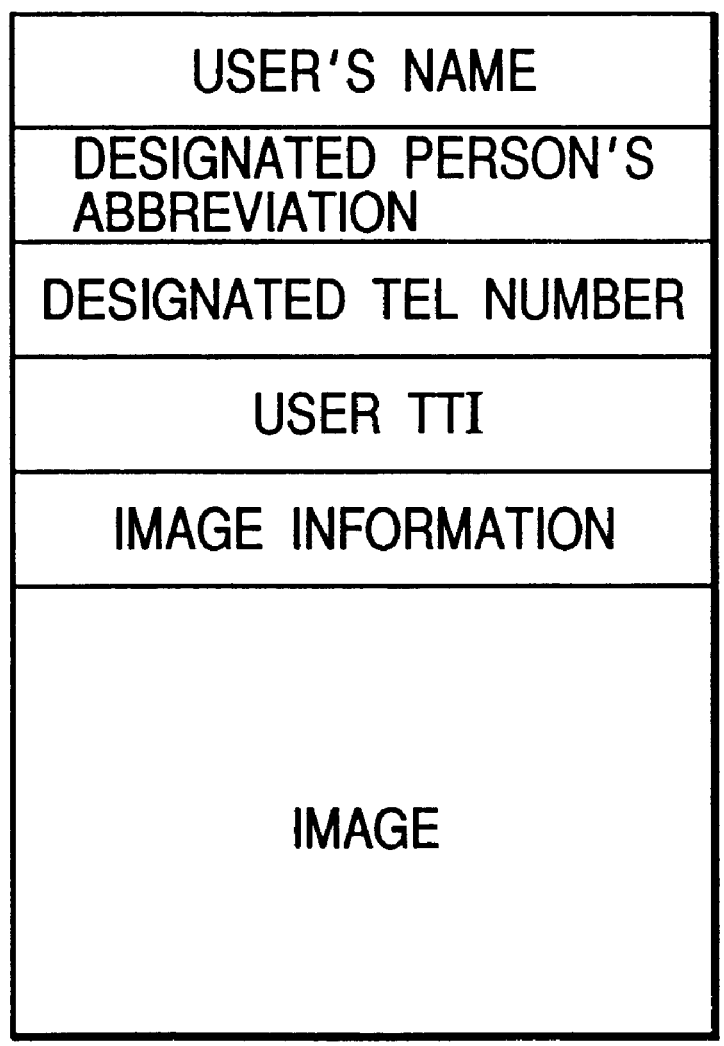
FIG. 5 is a diagram showing an example of the format of a transmission command to be sent from a client.

FIG. 5 shows an example of the format of a transmission command to be sent from the client 102, 103.

The transmission command includes: a user name for discriminating a transmission user (for this user name, the same user name registered in the user information table is used); a designated person's abbreviation; a designated person's telephone number; and a user TTI (information regarding transmission user) respectively written in a header of a transmission image. The transmission command also includes: image management information such as an image resolution, an image format and an image size; and the transmission image.

The transmission command is generated by software pre-installed in the client 102, 103, and transmitted via LAN to the facsimile 101.

Figure 6:
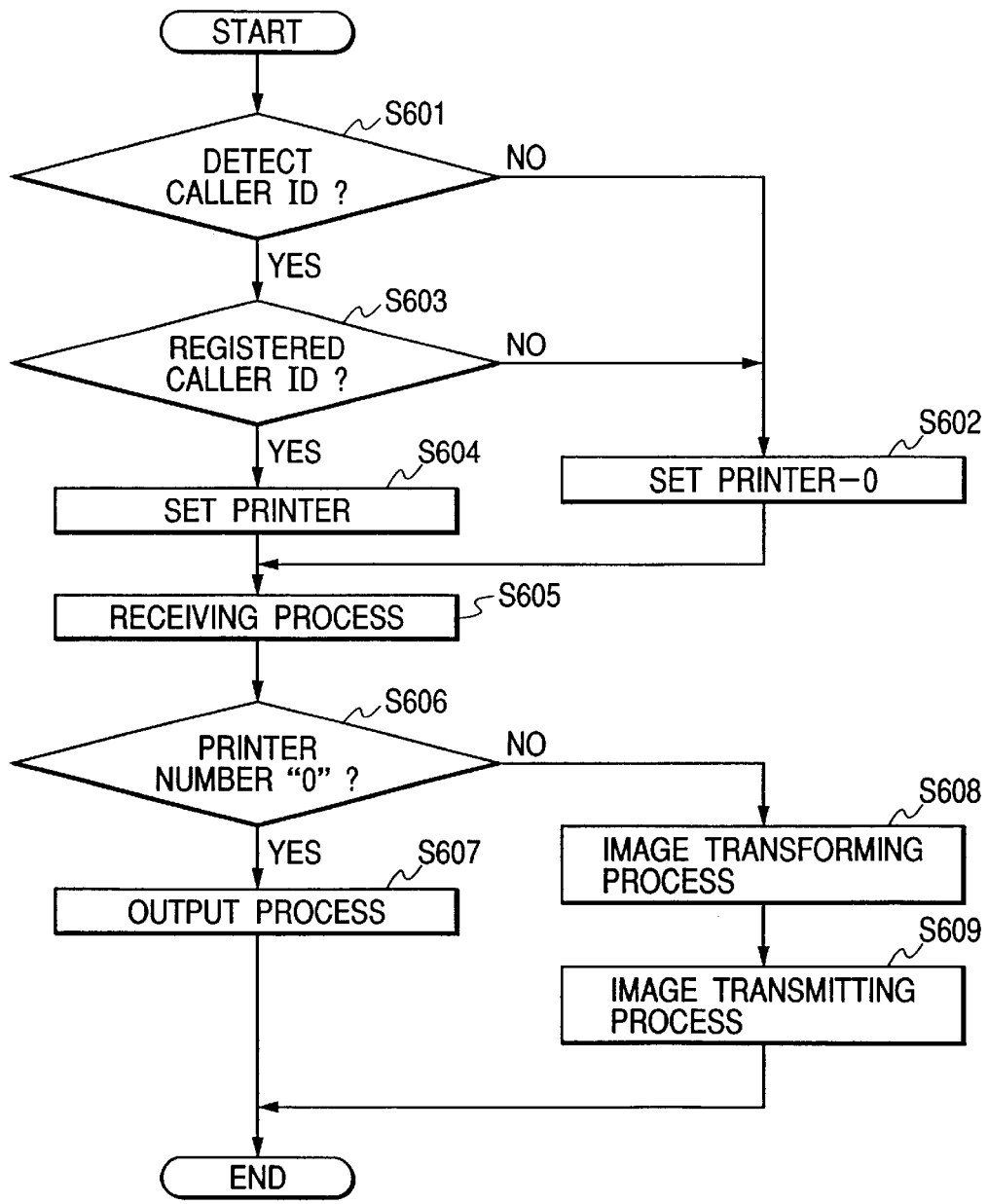
FIG. 6 is a flow chart illustrating a reception process to be executed by the facsimile apparatus 101 of the first embodiment.

FIG. 6 is a flow chart illustrating a reception process to be executed by the facsimile apparatus 101. This flow chart is controlled by the main control unit 201 in accordance with programs stored in ROM 209.

Referring to FIG. 6, upon reception of call incoming, the Caller ID detection unit 208 detects and analyzes the Caller ID (Step S601). If the Caller ID cannot be detected, the flow advances to Step S602 whereat a printer having the printer number of "0", i.e., the printer of the facsimile apparatus 101, is set as an output printer.

If the Caller ID is detected, it is checked whether the Caller ID or telephone number is already registered in the table shown in FIG. 4 (Step S603). If registered, a printer with the corresponding printer number is set as an output printer (Step S604). In this case, if a plurality of printers are already registered, a printer suitable for a reception image is selected. For example, if the reception image is a color image, a color printer is preferentially selected. If not registered at Step S603, the flow advances to Step S602 whereat the printer with the printer number of "0" is set as an output printer. After the output printer is set, a normal reception process is executed (Step S605). It is assumed in this embodiment that a reception process based upon the BFT mode recommended by ITU-T is executed.

After the reception process, it is checked whether the set output printer is the printer with the printer number of "0" (Step S606). If the printer with the printer number of "0", the reception image is output at the printer of the facsimile apparatus 101 (S607) to thereafter terminate the process. If the printer other than the printer with the printer number "0" is set, the image type of the reception document is discriminated, and the reception document is converted into image data compatible with the printer abilities registered in the printer information table shown in FIG. 3 (Step S608). In this embodiment, this conversion process is executed by the main control unit 201 by using software.

The converted image is transmitted via the I/F control unit 212 to the printer on LAN set at Step S604 (Step S609). In this embodiment, this transmission process uses a protocol in conformity with TCP/IP and is executed by the I/F control unit 212.

Figure 7:
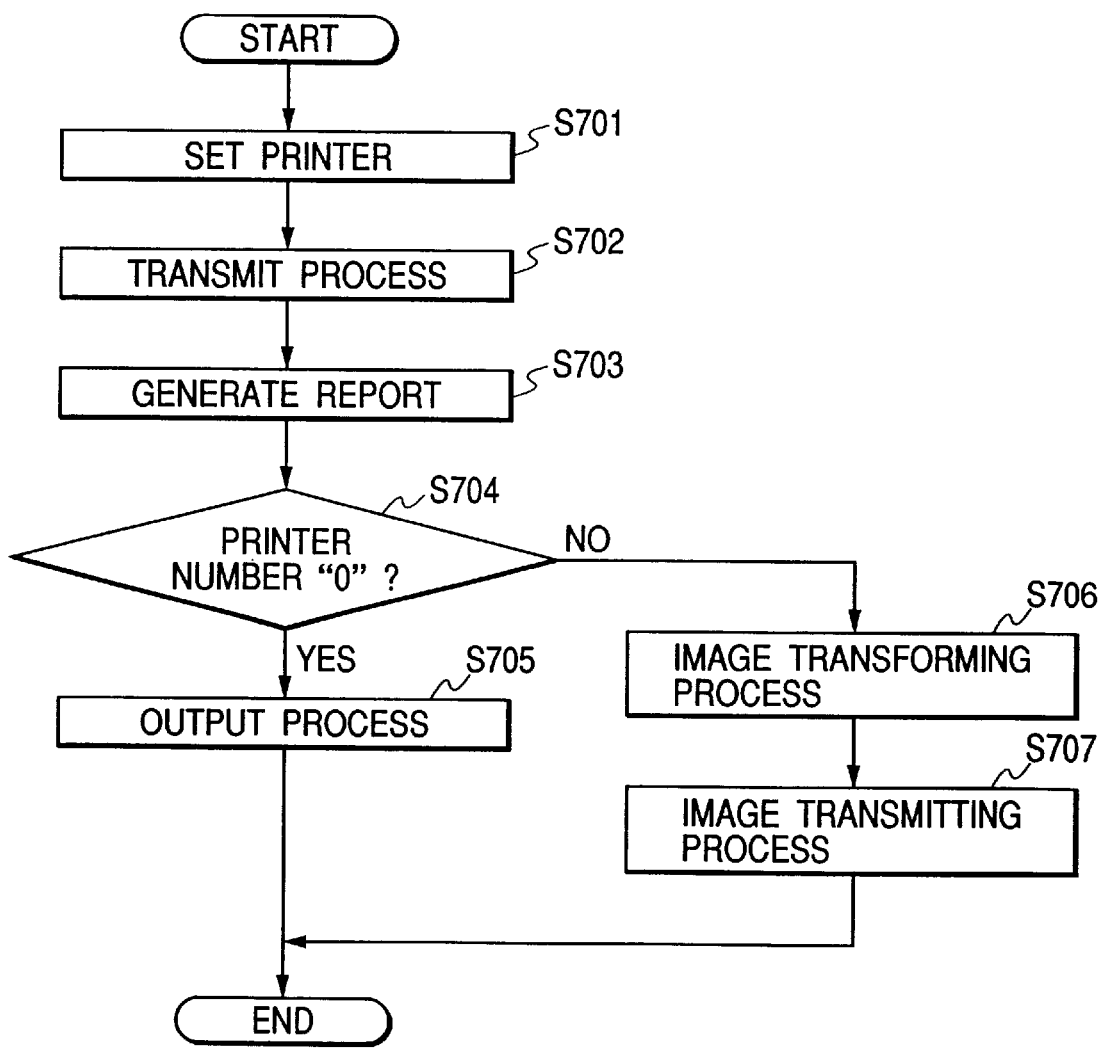
FIG. 7 is a flow chart illustrating a transmission process to be executed by the facsimile apparatus 101 of the first embodiment.

FIG. 7 is a flow chart illustrating a transmission process to be executed by the facsimile apparatus 101. This flow chart is controlled by the main control unit 201 in accordance with programs stored in ROM 209.

Referring to FIG. 7, upon reception of a transmission command shown in FIG. 5 from the client 102, 103, the transmission side is discriminated in accordance with the user name included in the transmission command, and a printer matching the transmission side is set as an output printer in accordance with the table shown in FIG. 4 (Step S701). After the output printer is set, a normal transmission process is executed (Step S702), and a report is formed in accordance with the transmission result (Step S703). The report is formed so as to match the abilities of the printer of the facsimile apparatus. In this embodiment, although the report is formed irrespective of a success or failure of the transmission result, it may not be formed in accordance with user setting.

After the report is formed, it is checked whether the set output printer is the printer with the printer number of "0" (Step S704). If the printer with the printer number of "0", the printer of the facsimile apparatus executes an output process (Step S705) to thereafter terminate the transmission process.

If a printer having the printer number different from "0" is set, the report is converted into image data compatible with the printer abilities registered in the printer information table shown in FIG. 3 (Step S706). In this embodiment, this conversion process is executed by the main control unit 201 by using software.

The converted image is transmitted via the I/F control unit 212 to the printer on LAN (Step S707). In this embodiment, this transmission process uses a protocol in conformity with TCP/IP and is executed by the I/F control unit 212.

In this embodiment, the Caller ID is used for selecting an output printer. If communication in conformity with ITU-T Recommendation T.30 is performed, the telephone number included in TSI (Transmitter Subscriber Identification) may be used and the its own receiving ability may be declared thereafter by using a specific protocol.

Also in this embodiment, although the telephone number of the transmission apparatus is detected for selecting an output printer, the invention is not limited only thereto, but other methods may also be used.

Specifically, a sub-address signal transmitted from a transmission apparatus is discriminated, and a reception image is output from the printer corresponding to the sub-address signal.

In this case, the Caller ID in the table shown in FIG. 4 is replaced by the sub-address. A table storing a correspondence between a sub-address and a printer is formed, and in accordance with this table, the processes similar to the case of the Caller ID are performed.

The transmission apparatus may directly designate the network address by using the sub-address signal.

Also in this embodiment, the printer information table shown in FIG. 3 and the user information table shown in FIG. 4 are stored in the memory 206 of the facsimile apparatus 101. If a facsimile server for data management between the facsimile apparatus 101 and LAN is additionally used, the table information may be stored in a memory of this server.

Although the printer is used for outputting the reception image, it may be a monitor or the like capable of outputting a visual image.

Second Embodiment

In the first embodiment, received image data is converted in accordance with an output destination. In the second embodiment, it is possible to request a transmission side to transmit image data matching the ability of an output destination.

A LAN facsimile system, a facsimile apparatus, a printer information table, and a user information table of the second embodiment are similar to those shown in FIGS. 1 to 4, and the description thereof is omitted.

Figure 8:
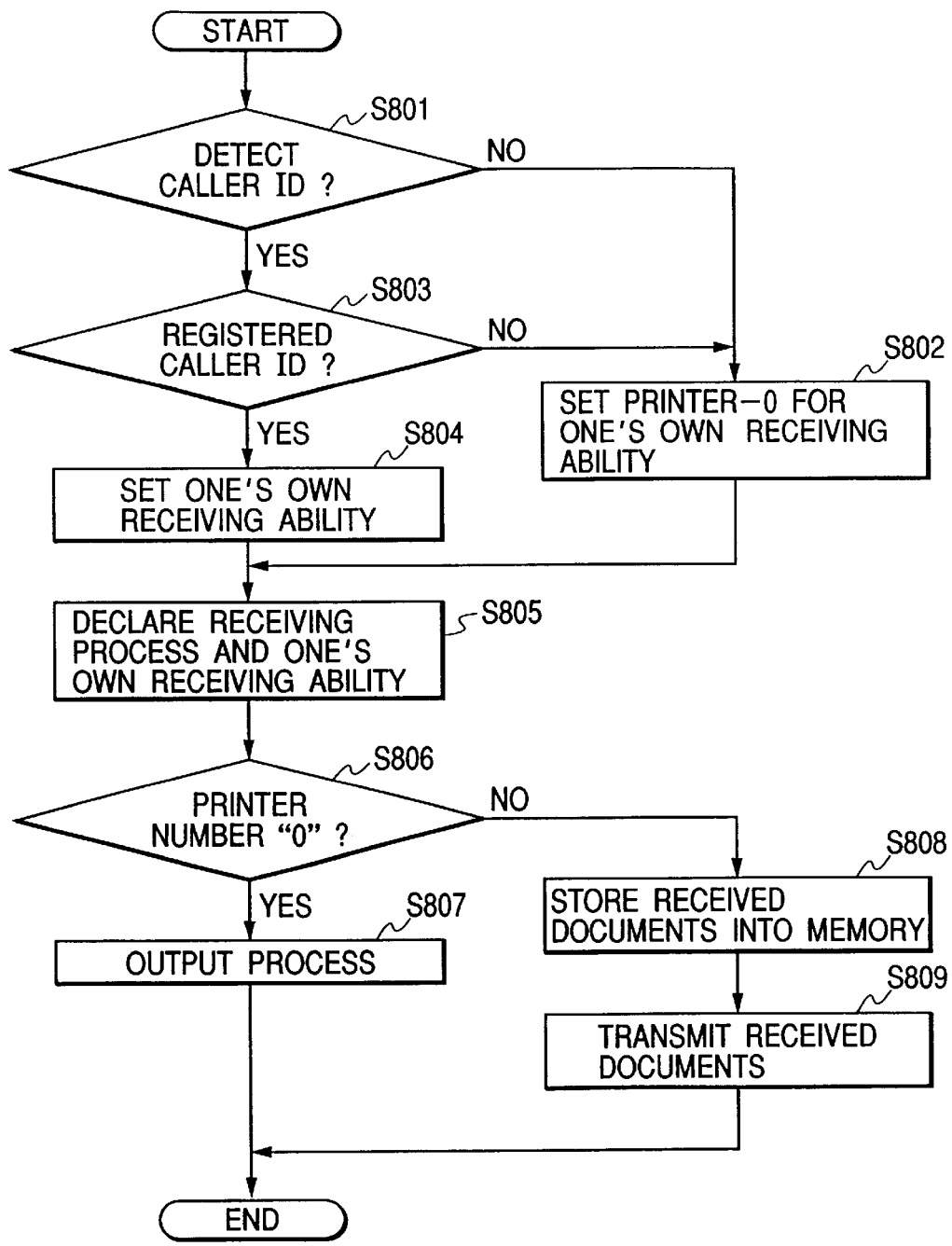
FIG. 8 is a flow chart illustrating a reception process to be executed by a facsimile apparatus 101 according to a second embodiment of the invention.

FIG. 8 is a flow chart illustrating a reception process to be executed by the facsimile apparatus 101 according to the second embodiment. This flow chart is controlled by the main control unit 201 in accordance with programs stored in ROM 209.

Upon reception of call incoming at the facsimile apparatus 101, the Caller ID detection unit 208 detects and analyzes the Caller ID (Step S801). If the Caller ID cannot be detected, the flow advances to Step S802 whereat the ability of a printer having the printer number of "0", i.e., the ability of the printer of the facsimile apparatus 101, is set as one's own receiving ability.

If the Caller ID is detected, it is checked whether the Caller ID or telephone number is already registered in the table shown in FIG. 4 (Step S803). If registered, the ability of a printer with the corresponding printer number is set as one's own receiving ability (Step S804). In this case, if a plurality of printers are already registered, a sum of abilities of all the printers is set as one's own receiving ability. If not registered at Step S803, the flow advances to Step S802 whereat the ability of the printer with the printer number of "0" is set as one's own receiving ability.

After the one's own receiving ability is set, a normal reception process in conformity with T.30 recommended by ITU-T is executed and at the same time the set one's own receiving ability is declared (transmitted) to a partner apparatus on the transmission side via the line (Step S805). In this case, the declared one's own receiving ability is the ability set at Step S802 or Step S804.

After the reception process of image data, it is checked whether the set one's own receiving ability is the ability of the printer with the printer number of "0" (Step S806). If the printer with the printer number of "0", the reception image is output at the printer of the facsimile apparatus 101 (S807) to thereafter terminate this routine. If the printer other than the printer with the printer number "0" is set, the reception document is stored in the memory 205 in correspondence with the Caller ID, printer number and the like (Step S808). At Step S809, the reception document is transmitted to the printer on LAN matching the type of the reception document, with reference to the tables shown in FIGS. 3 and 4. The document stored in the memory 205 may be output upon manual operation at any of the facsimile apparatus 101, clients 102 and 103, and printers 104 and 105.

In this case, the Caller ID and printer number in correspondence with the reception document or the image type of the reception document and the like are displayed, and in accordance with the displayed contents, a user selects an output destination of the reception document and transmits the document to the selected output destination.

In this embodiment, the facsimile apparatus 101 declares the abilities of the printer of a reception user, selectively as the one's own receiving ability, to the partner apparatus on the transmission side. Therefore, image data matching the ability of each printer on LAN can be received so that the image can be received at a user while resources of LAN are effectively used.

In this embodiment, the Caller ID is used for selecting the receiving ability to be declared. If communication in conformity with ITU-T Recommendation T.30 is performed, the telephone number included in TSI (Transmitter Subscriber Identification) may be used and the one's own receiving ability may be declared thereafter by using a specific protocol.

Also in this embodiment, although the telephone number of the transmission apparatus is detected, the invention is not limited only thereto, but other methods may also be used.

Specifically, a sub-address signal transmitted from a transmission apparatus is discriminated, and a printer matching the sub-address signal is selected to transmit the ability of the selected printer to the transmission apparatus.

According to the ITU-T Recommendation T.30, if the information included in TSI or the sub-address signal is used, after TSI or sub-address signal is received, the receiving ability matching the received contents is transmitted to the transmission apparatus. To this end, the contents of NSF (Nonstandard facilities), CSI (Called Subscriber Identification), and DIS (Digital Identification Signal) once transmitted are changed to match the contents of TSI and sub-address signal and thereafter again transmitted.

Similar to the first embodiment, if the sub-address is used, the Caller ID is replaced by the sub-address or the network address may be designated directly by using the sub-address.

Also in this embodiment, the printer information table shown in FIG. 3 and the user information table shown in FIG. 4 are stored in the memory of the facsimile apparatus 101. If a facsimile server for data management between the facsimile apparatus 101 and LAN is additionally used, the table information may be stored in a memory of this server.

Although the printer is used for outputting the reception image and for transmitting the receiving ability thereof to the transmission apparatus, it may be another device so long as it can process the reception image.

Obviously, both the processes of the first and second embodiments may incorporated.

The present invention is not limited only to the above embodiment apparatuses. The present invention may be applied to a system constituted of a plurality of apparatuses or to a system constituted of a single apparatus. Obviously, the functions of the embodiments can be realized by supplying a storage medium storing software program codes achieving such functions to a system or apparatus whose computer (CPU or MPU) reads and executes the program codes. In this case, the software program codes themselves realize the embodiment functions. Therefore, the program codes themselves read from the storage medium realize the functions of the embodiments and constitute the present invention.

The storage medium storing such program codes may be a floppy disk, a hard disk, an optical disk, a magneto-optical disk, a CD-ROM, a CD-R, a magnetic tape, a non-volatile memory card, a ROM, and the like.

Obviously, such program codes are other types of embodiments of this invention, not only for the case wherein the embodiment functions are realized by executing the program codes supplied to the computer but also for the case wherein an OS on which the computer runs executes part or the whole of the actual tasks for realizing the embodiment functions in accordance with the program codes. Furthermore, the scope of the invention also includes obviously the case wherein in accordance with the program codes stored in a memory of a function expansion board or unit connected to the computer supplied with the program codes, a CPU or the like of the function board or unit executes part or the whole of the actual tasks for realizing the embodiment functions.

The invention has been described in connection with the above preferred embodiments. The invention is not limited only to the above embodiments, but various modification are possible without departing from the scope of the appended claims.

What is claimed is:

1. A data communication apparatus connected to a plurality of terminals, comprising:

a transmitter, arranged to transmit data to a terminal via a line in accordance with a transmission request received from a user via one of the plurality of terminals;

a connector, arranged to connect said data communication apparatus to a plurality of printers without using the line;

a storage unit, arranged to store a table of information indicating, respectively, correspondence between a plurality of users and the plurality of printers;

a control unit, arranged to generate a report including information representative of a result of a transmission performed by said transmitter;

a determination unit, arranged to determine at least one printer corresponding to the user associated with the transmission request, based on the table stored in said storage unit; and a transferor, arranged to transfer the report generated by said control unit to the at least one printer determined by said determination unit through said connector.

2. An apparatus according to claim 1, further comprising a discriminator, arranged to discriminate a data processing ability of a printer to which the report is transferred by said transferer, wherein said control unit generates the report in a format matching the data processing ability discriminated by said discriminator.

3. A method of controlling a data processing apparatus that is connectable to a plurality of printers, comprising the steps of:

connecting the data processing apparatus to a plurality of terminals;

connecting the data processing apparatus to the plurality of printers;

receiving a transmission request from a user via one of the plurality of terminals;

transmitting data to a line in accordance with the received transmission request;

storing a table of information indicating, respectively, correspondence between a plurality of users and the plurality of printers;

generating a report including information representative of a result of the transmission;

determining at least one printer corresponding to the user associated with the transmission request, based on the stored table; and transferring the generated report to the at least one printer determined in said determining step without using the line.

4. A computer-readable storage medium storing a program for implementing a method of controlling a data processing apparatus that is connected to a plurality of terminals and a plurality of printers, the program comprising:

code for a first connection step of connecting the data processing apparatus to the plurality of terminals;

code for a second connection step of connecting the data processing apparatus to the plurality of printers;

code for a reception step of receiving a transmission request from a user via one of the plurality of terminals;

code for a transmission step of transmitting data to a line in accordance with the received transmission request;

code for a storage step of storing a table of information indicating, respectively, correspondence between a plurality of user and the plurality of printers;

code for a generation step of generating a report including information representative of a result of the transmission;

code for a determination step of determining at least one printer corresponding to the user associated with the transmission request based on the stored table; and code for a transfer step of transferring the generated report to the at least one printer determined in the determination step without using the line.

* * * * *

UNITED STATES PATENT AND TRADEMARK OFFICE
CERTIFICATE OF CORRECTION

PATENT NO.  : 6,785,022 B1
DATED       : August 31, 2004
INVENTOR(S) : Shinji Todaka It is certified that error appears in the above-identified patent and that said Letters Patent is hereby corrected as shown below:

Column 2,
Line 61, "connected" should read -- connected via --.

Column 3,
Line 32, "is" (first occurrence) should read -- be --.
Line 42, "uses" should read -- use --.
Line 65, "call incoming," should read -- incoming call, --.

Column 4,
Line 66, "in conformity" should read -- conforming --.

Column 5,
Line 2, "in confirmity" should read -- conforming --.
Line 5, "the" should be deleted.
Line 48, "call incoming" should read -- incoming call --.
Line 67, "in conformity" should read -- conforming --.

Column 6,
Line 34, "in con-" should be deleted.
Line 35, "formity" should read -- conforming --.

Column 8,
Line 7, "transferer," should read -- transferor, --.

Signed and Sealed this

Sixteenth Day of November, 2004

JON W. DUDAS
*Director of the United States Patent and Trademark Office*